United States Patent [19]

Toyama et al.

[11] Patent Number: 4,809,668

[45] Date of Patent: Mar. 7, 1989

[54] IGNITION SYSTEM FOR INTERNAL COMBUSTION ENGINE

[75] Inventors: Koichi Toyama, Kariya; Ko Narita, Aichi; Toshihito Nonaka, Obu, all of Japan

[73] Assignee: Nippondenso Co., Ltd., Kariya, Japan

[21] Appl. No.: 31,033

[22] Filed: Mar. 26, 1987

[30] Foreign Application Priority Data

| Mar. 31, 1986 | [JP] | Japan | 61-74931 |
| Jun. 10, 1986 | [JP] | Japan | 61-134244 |
| Aug. 29, 1986 | [JP] | Japan | 61-204877 |
| Sep. 15, 1986 | [JP] | Japan | 61-217612 |

[51] Int. Cl.$^4$ .................................. F02P 3/045
[52] U.S. Cl. .................................... 123/609
[58] Field of Search ................ 123/609, 610, 611

[56] References Cited

U.S. PATENT DOCUMENTS

| 3,937,193 | 3/1976 | Kim | 123/611 |
| 4,228,779 | 10/1980 | Wetzel | 123/652 |
| 4,275,701 | 6/1981 | Arguello et al. | 123/609 |
| 4,429,235 | 1/1984 | Minner | 123/609 |

FOREIGN PATENT DOCUMENTS

| 2833344 | 2/1980 | Fed. Rep. of Germany | 123/610 |
| 60-53187 | 11/1985 | Japan | |

Primary Examiner—Andrew M. Dolinar
Attorney, Agent, or Firm—Cushman, Darby & Cushman

[57] ABSTRACT

An ignition system for and internal combustion engine ignition coil energization time is controlled in accordance with operating conditions. First and second sections with respective constant angles in an ignition cycle are defined. An integrating circuit integrates in one direction in the second section of a preceding ignition cycle of the angle signal, and in the other direction in the first section of the next ignition cycle. When the integration value reaches a first predetermined value, an energization start signal is generated. An ignition coil begins to be energized at the time of generation of the energization start signal or at the shift of the angle signal from the first section to the second section, whichever arrives earlier, and the energization is stopped when the angle signal shifts from the second to first section. The engine speed is detected to change the rate of integration of the integrating circuit thereby to change the first predetermined value for generating the energization start signal. When the integration value in the second section reaches a second predetermined value cooresponding to the low-speed engine operation, the energization start signal is invalidated thereby to fix the coil energization time in the second section.

14 Claims, 13 Drawing Sheets

IGNITION SYSTEM FOR INTERNAL COMBUSTION ENGINE

BACKGROUND OF THE INVENTION

The present invention relates to an ignition system for an internal combustion engine mainly applied to an automobile for controlling the dwell angle of an ignition coil at an optimum value.

In a conventional ignition system for the internal combustion engine of this type such as disclosed in U.S. Pat. No. 3,937,193, a signal generator generates an angle signal defining first and second sections of an ignition cycle with respective constant angles. An integrator circuit integrates in one direction during the first section and integrates in the other direction during the second section. An energization start signal generating circuit is enabled when the integration value of the integrator circuit reaches a predetermined value in the second section, and the primary current is cut off when the angle signal transfers from the second to first section thereby to generate a high ignition voltage on the secondary of the ignition coil.

In the above-mentioned conventional ignition system, however, assume that the angle signal of the signal generator transfers from the second to first section before the integration value of the integrator circuit reaches the predetermined value e.g. in the case of a sudden acceleration of the internal combustion engine. Under such a condition, a signal for turning off a power transistor is applied before the primary current flows in the ignition coil, with the result that an ignition high voltage fails to be generated in the ignition coil on the one hand and the integration is effected again in a direction from the midway integration value remaining in the integrator circuit on the other hand. As a consequence, the integration amount for the next cycle of integration in the other direction becomes larger than normally required, so that the time point when the integration value reaches the predetermined value in the second section, that is, the time point of start of the primary current is delayed, thereby causing a shortage of the ignition energy for the next ignition cycle.

Further, in the case where the engine speed is very low, the integration amount of the integrator circuit is limited in the second section to cause a shortage (saturation) of the integration amount of the integrator circuit of the second section. This causes the integration to reach a predetermined value earlier in the first section, resulting in an excessively long energization period.

To obviate this problem, a conventional system detects the engine speed, and when the detected speed is lower than a predetermined level, the energization start time point of the ignition coil is set to a fixed angular position (Japanese Patent Post-Examination Publication No. 53187/85). In this conventional system, however, it is necessary to provide a separate circuit for detecting the engine speed, and its construction is complicated.

SUMMARY OF THE INVENTION

The object of the present invention is to provide an ignition system for the internal combustion engine which is capable of producing a sufficient ignition energy even in a sudden acceleration. Accordingly the present invention satisfactorily secures both a supply period of the primary current in a sudden acceleration and a spark arc period in a high speed engine operation.

Another object of the present invention is to provide an ignition system for the internal combustion engine in which a sufficiently high ignition voltage can be generated in the ignition coil in a sudden or sharp acceleration of the internal combustion engine and the energization period of the ignition coil is positively prevented from becoming excessively long in a very slow engine operation by a simple construction.

According to the present invention, there is provided an ignition system for the internal combustion engine, comprising a signal generator for generating an angle signal dividing an ignition cycle into a first section and a second section with respective substantially constant angles, an integration circuit for integrating in one direction in the first section of an ignition cycle and integrating in the other direction in the second section thereof, an energization-start signal generating circuit for generating a coil-energization start signal in synchronism with a time point when the integration value of the integrating circuit reaches a predetermined value in the first section, a transistor turned on and off in response to the energization start signal and the switching of the angle signal between said first and second sections, an ignition coil for generating a high voltage by turning on and off the primary current in response to the turning on and off of the transistor, means for integrating the integrating circuit in one direction in the second section of the immediately preceding ignition cycle and in the other direction in the first section of the next ignition cycle, and control means for turning on the power transistor when the energization start signal is generated or when the angle signal transfers from the first section to the second section, whichever is earlier, while turning off the power transistor when the angle signal transfers from the second section to the first section.

According to another aspect of the present invention, there is provided an ignition system for the internal combustion engine comprising a reset circuit for generating a reset pulse of a short duration for resetting the integration value of the integrating circuit to an initial value in synchronism with the start of the primary current in the ignition coil.

According to still another aspect of the present invention, there is provided an ignition system for the internal combustion engine comprising means for detecting the engine speed and changing the rate of integration in the other direction in the first section of the integrating circuit while at the same time changing a preset value of the energization start signal generating circuit.

According to a further aspect of the present invention, there is provided an ignition system for the internal combustion engine comprising an energization-start-signal invalidating circuit for virtually invalidating the energization start signal when the integration value in one direction of the integration circuit in the second section of the ignition cycle reaches a second preset value corresponding to a low-speed setting.

According to the present invention, in the case where the angle signal of the signal generator transfers from the first section to the second section before generation of the energization start signal in a sudden acceleration of the internal combustion engine, the power transistor is turned on thereby to start conduction of the primary current in the ignition coil. As a result, a minimum amount of the necessary primary-current conduction time is secured while the angle signal of the signal generator is located in the second section even in a sudden acceleration.

Further, in synchronism with the conduction start of the primary current, a reset pulse with a short duration is generated in a reset circuit thereby to reset the integration value of an integrating circuit to an initial value instantaneously. As a result, the integration of the integrating circuit can be started from the initial value in the next ignition cycle even in a sudden acceleration. In this way, the possible delay of the energization start timing in the next ignition cycle is prevented, thereby leading to a superior advantage that the shortage of ignition energy is positively prevented.

Furthermore, in view of the fact that engine speed is detected to switch from a fixed conduction time control to a fixed conduction angle control for a high-speed engine operation, a spark arc time can be secured to keep an optimum energization angle during a high-speed engine operation.

Also, an integration value of the intergrating circuit corresponding to the engine speed is detected to fix the dwell angle equivalent to the second section of the signal generator during a very low engine speed operation, so that an excessively large dwell angle is avoided during a very low engine speed operation by a comparatively simple construction.

DESCRIPTION OF THE PREFERRED EMBODIMENTS

Figure 1:
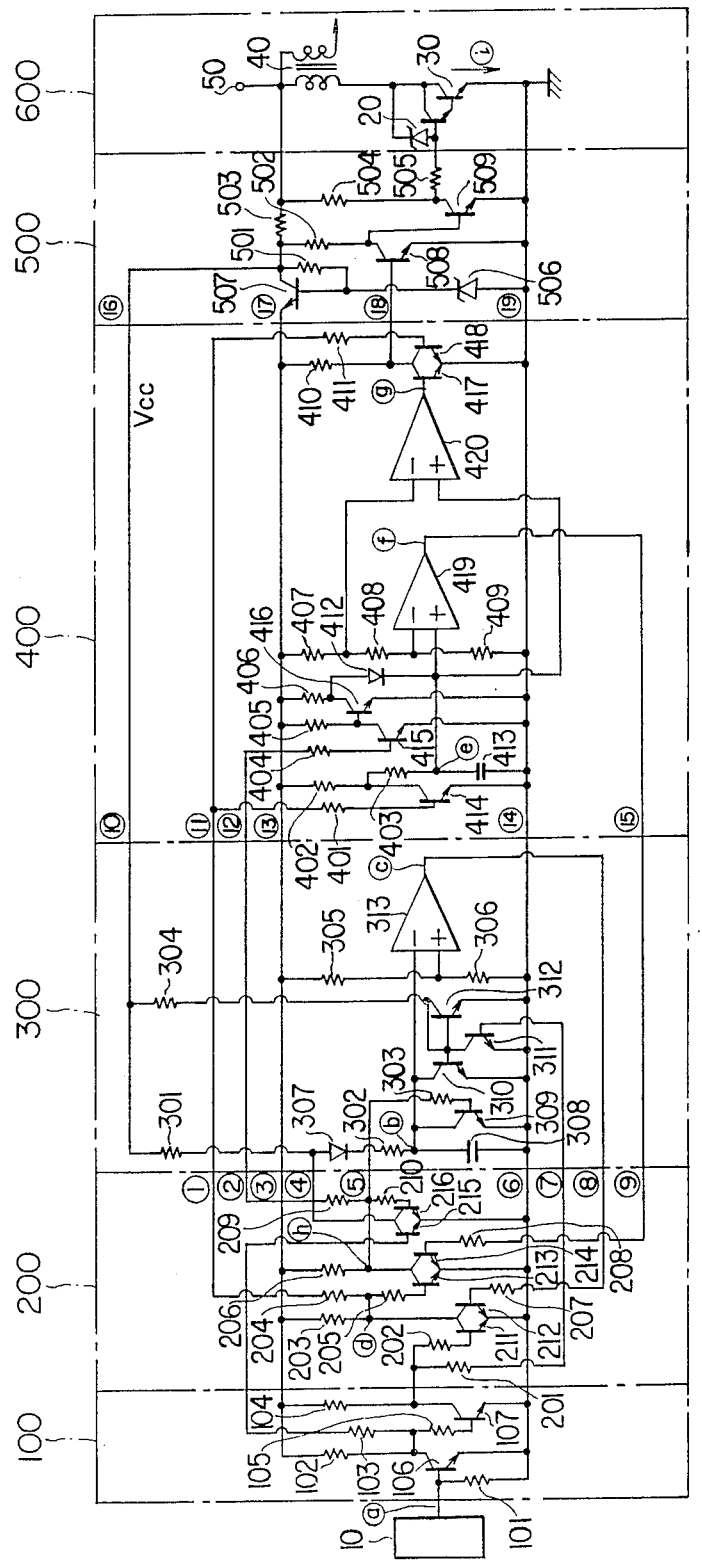
FIG. 1 is a circuit diagram showing a first embodiment of the ignition system according to the present invention.

The first embodiment of the present invention will be explained below with reference to the circuit diagram of FIG. 1 and the operation waveforms shown in FIG. 2. First, in FIG. 1, reference numeral 10 designates a signal generator for generating an ignition angle signal divided into first and second sections of substantially fixed angles, in response to the rotational angle of the internal combustion engine as detected by a Hall effect device or the like. Numeral 30 designates a power transistor, and numeral 20 a zener diode for breakdown protection of the power transistor 30.

Numeral 40 designates an ignition coil, and numeral 50 a battery terminal connected to the anode of a battery through a key switch not shown. Now, explanation will be made of a control circuit. Numeral 100 designates an input waveform shaping circuit for shaping the waveform of the angle signal produced from the signal generator 10, and including resistors 101 to 105 and transistors 106, 107. Numeral 200 designates a charge-discharge control circuit including resistors 201 to 210 and transistors 211 to 216.

Numeral 300 designates a summing-subtracting integrator circuit including resistors 301 to 306, diode 307, capacitor 308, transistors 309 to 312 and comparator circuit 313.

Numeral 400 designates a continuous-conduction-blocking monostable circuit including resistors 401 to 411, diode 412, a capacitor 413, transistors 414 to 418 and comparator circuits 419 and 420.

Numeral 500 designates a constant-voltage output amplifier circuit including resistors 501 to 505, zener diode 506 and transistors 507 to 509.

Now, explanation will be made of the operation of the system configured as above. In FIG. 2, the left part shows an operation mode with engine speed comparatively low, the middle part with engine speed comparatively high, and the right part with engine stopped and the key switch turned on. In FIG. 2, waveforms shown as (a) to (i) to represent waveforms produced at the component elements designated by the same reference characters in FIG. 1. First, reference is had to the left part of FIG. 2.

During the second section of the preceding ignition cycle from time $t_0$ to $t_1$ when the angle signal of the signal generator 10 is at a high level, the capacitor 308 is charged up exponentially with a certain voltage. At time point $t_1$ when the angle signal of the signal generator 10 changes from high to low level, the transistor 106 turns off and the transistor 215 on, so that the capacitor 308 that has thus far been charged through the resistor 301, diode 307 and the resistor 302 stops being charged. At the same time, the transistor 107 turns on, and turns off the transistor 311, and a current mirror circuit including transistors 310 and 312 causes a current equal to the current flowing through resistor 304 from a power source therefor (referring to $V_{cc}$ described later) to start the time-subtracting integration of the charges in the capacitor 308 through the transistor 310, with the result that the terminal voltage (waveform (b)) of the capacitor 308 linearly decreases as long as the angle signal of the signal generator 10 is at the low level during the first section of the ignition cycle.

At the time point t₂ when the voltage across the capacitor 308 decreases to a first reference voltage $VT_1$ determined by the resistance ratio between the resistor 305 and the resistor 306, the output of the comparator circuit 313 (waveform (c)) increases to a high level turning on the transistor 212 and off the transistor 213.

Since the output of the comparator circuit 419 (waveform (f)) is still at low level, and transistor 214 is off, its common-collector waveform (h) is raised to high level (reset pulse), and the transistor 309 turns on thereby to discharge the charges from the capacitor 308 rapidly to the initial value (0V).

On the other hand, the turning on of the transistor 212 causes the turning off of the transistor 414, and the capacitor 413 is charged up through resistors 402 and 403 from a constant-voltage source. At the same time, the turning off of the transistor 213 turns on transistor 415, so that the capacitor 413 is charged through resistor 406 and diode 412.

As a result, the terminal voltage across the capacitor 413 (waveform (e)) increases rapidly. Also, the turning on of the transistor 212 turns off transistor 418, with the result that the power transistor 30 is turned on thereby to start energization of the primary coil of the ignition coil 40.

Figure 2:
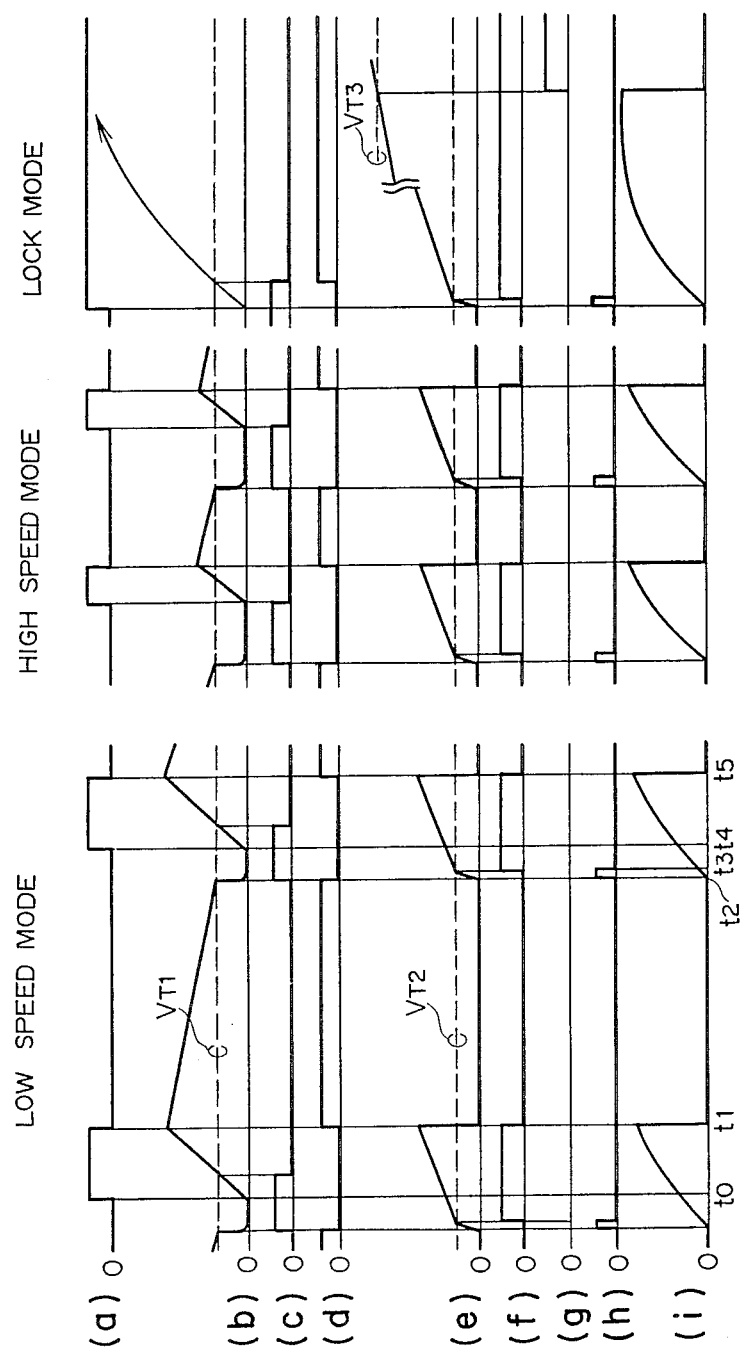
FIG. 2 shows waveforms produced at various parts of the system to explain its operation.

At the time point t₃ when the terminal voltage across the capacitor 413 reaches a second reference voltage $VT_2$ determined by the resistance ratio between resistors 407, 408 and resistor 409, the output of the comparator circuit 419 (waveform (f)) rises to high level, and the transistor 214 turns on thereby to extinguish the reset pulse (h) shown in FIG. 2.

As a consequence, the transistor 309 turns off and the rapid discharge circuit for the capacitor 308 is closed, while the transistor 415 turns off with the transistor 416 turned on, the charging of the capacitor 413 through the resistor 406 stops, and the charging gradient of the capacitor 413 thus becomes gentle. The capacitor 308 fails to start being charged since the transistor 215 is on although the transistor 216 is off.

At the time point when the angle signal (waveform (a)) of the signal generator 10 rises to the high level, the transistor 106 turns on and the transistor 215 off, so that the capacitor 308 begins to be charged through the resistor 301.

When the output of the signal generator 10 is reduced to low level again at the time point t₅, the transistor 211 turns off while the transistor 418 turns on. The power transistor 30 is thus turned off thereby to stop the conduction of current through the primary of the ignition coil 40, thus inducing a high ignition voltage in the secondary.

Now, explanation will be made briefly of the middle part of FIG. 2. With the increase in engine speed, less amount of charge is charged on the capacitor 308, which accordingly shortens the discharge period of the capacitor before reaching the first reference voltage $VT_1$, resulting in an earlier start of energization of the ignition coil 40. The characteristic of the primary energization angle to the engine speed will not be explained herein later quantitatively.

Now, brief explanation will be made of the right part of FIG. 2.

With the key switch turned, assume that with the engine stopped, the angle signal of the signal generator 10 is left at high level and the transistor 211 left on, or that the angle signal of the signal generator 10 is left at low level and the charge of the capacitor 308 is discharged to zero, with the comparator circuit 313 left at high level and the transistor 212 left on. Then the transistor 414 is left off.

As a result, the terminal voltage across the capacitor 413 continues to rise, and at the time point when the voltage across the capacitor 413 reaches a third reference voltage $VT_3$ determined by the resistance ratio between the resistor 407 and the resistors 408, 409 is set to a sufficiently large value as compared with the second reference voltage $VT_2$, the output of the comparator circuit 420 (waveform (g)) is raised to a high level, so that the transistor 417 is turned on thereby to prevent the power transistor 30 from being turned on continuously.

Figure 3:
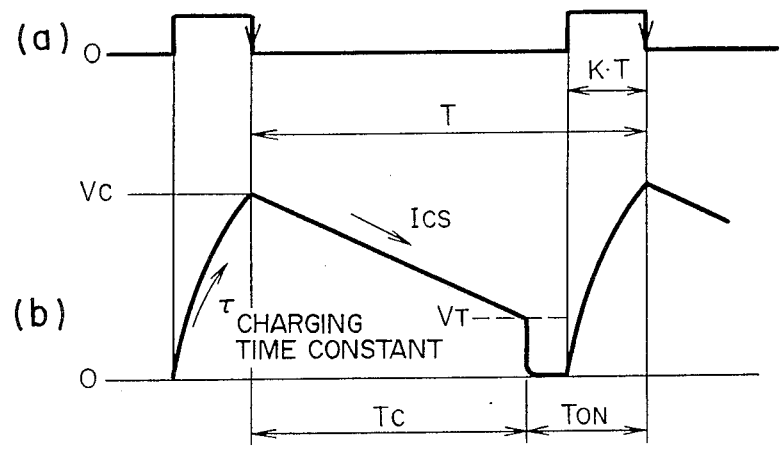
FIG. 3 shows waveforms illustrating the operating principle of the system according to the present invention.

Now, the characteristic of the energization angle $\theta$ versus change in engine speed N will be explained quantitatively. First, the principle of dwell angle control will be explained with reference to FIG. 3. The diagram (a) shows an angle signal waveform of the signal generator 10, (b) a waveform of the terminal voltage across the capacitor 308 of the summing-subtracting integrator circuit 300. Assume that the operation of the high-level portion to low-level portion of the signal generator 10 is taken with K for the high-level portion as shown when an ignition cycle T is associated with a given engine speed. During this high-level period, that is, during a time K·T, the capacitor 308 performs a summing integration according to an exponential function of time (charged), while during the remaining period (T−K·T), it performs a simple subtracting integration (discharged), and at a time point when the subtracting integration value reaches a predetermined value VT, the coil energization is started, the energization being stopped at a fall time from high to low level of the angle signal of the signal generator 10. If the energization time of the ignition coil 40 is equal to the period designated by $T_{ON}$ in the diagram, the energization angle is calculated in the manner described below.

Assume that

C: Capacity of capacitor 303,

K: Duty factor of the signal generator, $R_{301}$: Combined series resistance value of resistors 301 and 302, $R_{304}$: Resistance value of resistor 304, $V_{cc}$: Source voltage of resistors 301 and 304, and $V_c$: Charge voltage of capacitor 308 and that for the purpose of calculations, the base-emitter voltage of the transistor 312 is $V_{BE}$ ($\approx 0$), and the forward voltage effect of the diode 307 $V_F$ ($\approx 0$).

$$V_c = V_{cc} \cdot \left[1 - \exp\left(-\frac{K \cdot T}{R_{301} \times C}\right)\right]$$

The discharge current of the capacitor 308 is given as $$I_{CS} = \frac{V_{cc}}{R_{304}}$$

Figure 4:
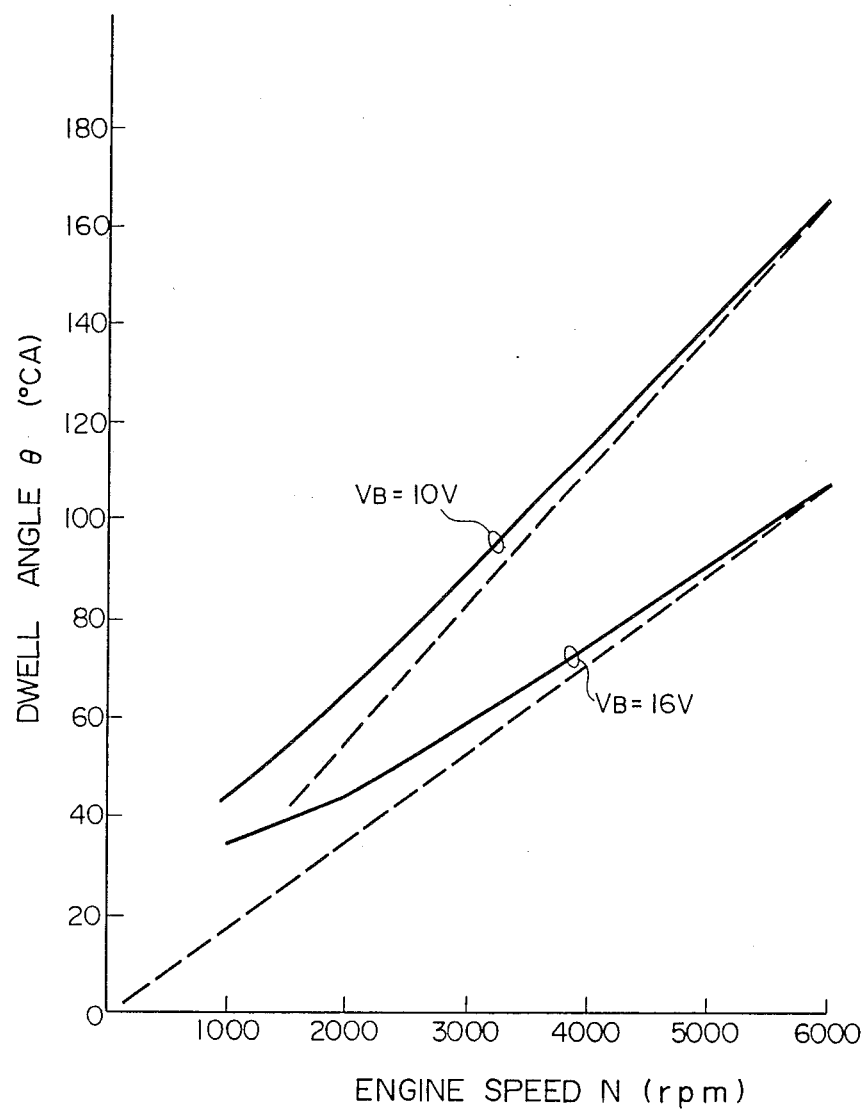
FIG. 4 shows the characteristic of engine speed versus dwell angle of the system shown in FIG. 1.

-continued $$T_{ON} = T - TC$$

$$= T - \frac{(V_c - V_T) \cdot C}{I_{CS}}$$

$$= T - \frac{V_c \times C}{I_{CS}} + \frac{V_T \cdot C}{I_{CS}}$$

$$= T - \frac{V_c \times C \times R_{304}}{V_{cc}} + \frac{V_T \times C \times R_{304}}{V_{cc}}$$

$$= T - \frac{V_{cc} \times C \times R_{304}}{V_{cc}}$$

$$\left[1 - \exp\left(-\frac{K \cdot T}{R_{301} \times C}\right)\right] +$$

$$\frac{V_T \times C \times R_{304}}{V_{cc}}$$

$$T_{ON} = T - C \cdot R_{304}\left[1 - \exp\left(-\frac{K \cdot T}{R_{301} \times C}\right)\right] +$$

$$\frac{V_T \times C \times R_{304}}{V_{cc}}$$

where $V_T$ is assumed to be 0.2 (V), C to be 0.22 (μF), $R_{301}$ to be 136 (KΩ), $R_{304}$ to be 800 (KΩ), $V_{cc}$ 0.8 times higher than the battery voltage $V_B$ by voltage drop from the source voltage through the resistor 503, and K to be the ratio of 30° CA/180° CA. FIG. 4 shows the result of a calculation for the battery voltages of 10V and 16V in the case of a battery having a rating of 12V.

In FIG. 4, dashed lines indicate an ideal dwell angle characteristic with a fixed energization time for obtaining a specific primary current. Unlike in the conventional system in which the dwell angle changes in proportion to the engine speed of the internal combustion engine, this embodiment is such that the capacitor is charged exponentially in the second section in such a way that the energization or conduction time in the low-speed region which often causes a shortage of the energization time during acceleration of the internal combustion engine is provided in a large amount in comparison with the ideal dwell angle characteristic.

Also, if the output signal of the signal generator 10 changes from low to high level before the discharge voltage of the capacitor reaches the first reference voltage during sudden or sharp acceleration of the internal combustion engine, the transistor 211 is turned on thereby to turn on the power transistor 30 through the transistor 418, 508 and 509, thus starting the energization of the primary of the ignition coil 40. By doing so, a minimum required energization time of the primary current is secured during the high-level period of the output of the signal generator 10 even at the time of sharp acceleration.

Further, at the start of energization of the primary current, a reset pulse of short duration as shown in FIG. 2(h) is generated at the base of the transistor 309 thereby to turn on the transistor 309 instantaneously, thus discharging the capacitor 308 to the initial value (0V). The pulse duration of the reset pulse is so short that the charging of the capacitor 308 in the second section is not substantially affected.

It is thus possible to charge the capacitor 308 from the initial value during the next ignition cycle even at the time of sharp acceleration, thereby preventing the conduction start from being delayed in the next ignition cycle.

Further, in view of the fact that the charge current of the capacitor 413 is reduced with a different gradient after the second reference voltage is reached, the reset pulse with the short duration and a much longer cut-off signal for the power transistor 30 left on can be generated accurately by detecting the terminal voltage across the single capacitor 413 through the comparator circuit 419 and 420.

Figure 5:
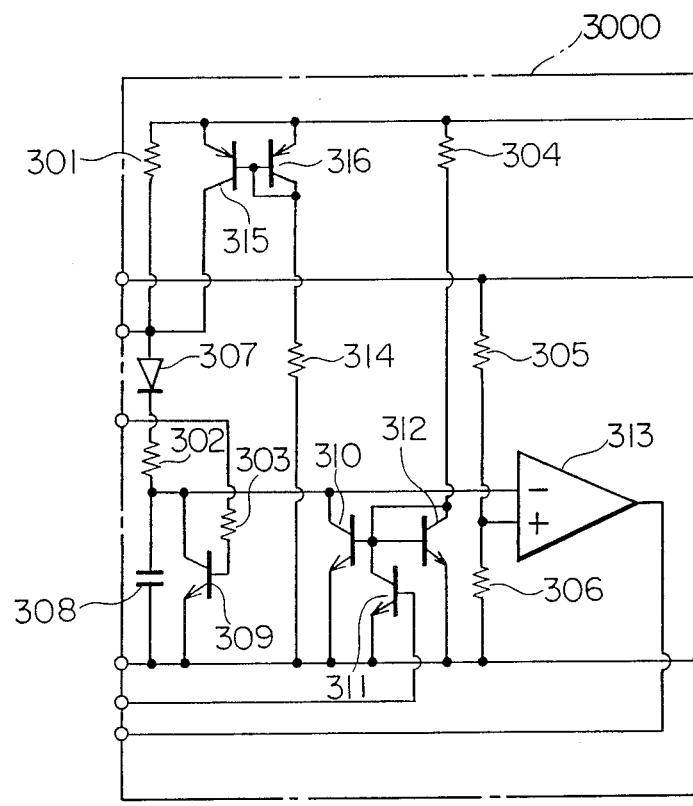
FIG. 5 is a circuit diagram showing another embodiment of a summing-subtracting integrator circuit used for the system shown in FIG. 1.

FIG. 5 shows another embodiment 3000 of the summing-subtracting integrator applied to the system shown in FIG. 1. In FIG. 5, a current mirror circuit including a resistor 314 and transistors 315, 316 is added to the summing-subtracting integrator circuit 300 of the system shown in FIG. 1, with the intention of summing integration of the capacitor 308 combining a linear summing integration and an exponential summing integration.

Figure 6:
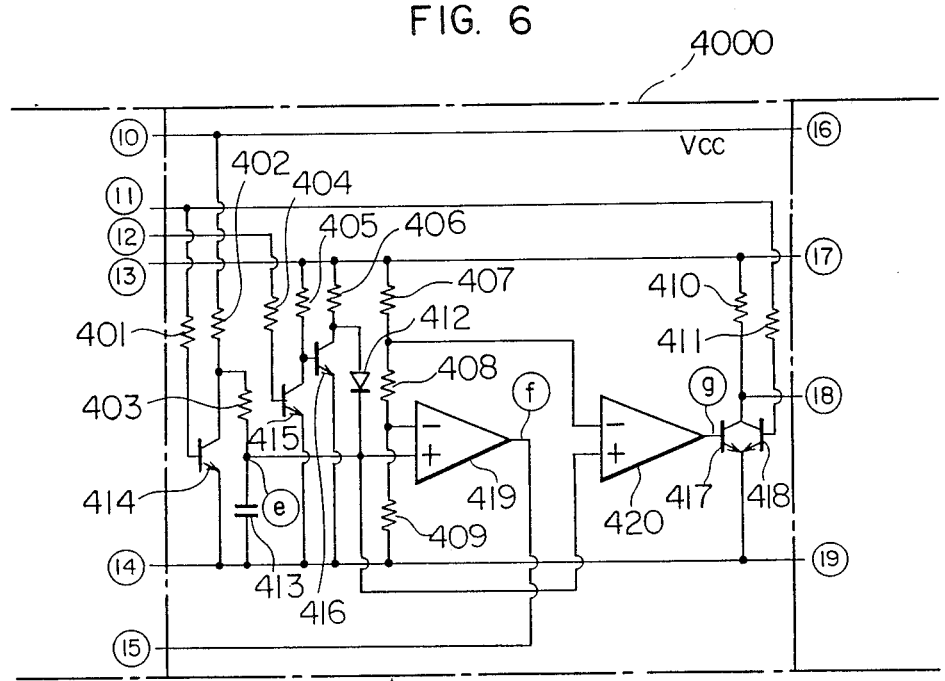
FIG. 6 shows an electrical circuit of another embodiment of the system according to the present invention.

A second embodiment of the system according to the present invention is shown in FIG. 6. This embodiment is different from the first embodiment in that in this embodiment, an end of a resistor 402 for charging the capacitor 413 is connected to the collector (battery voltage $V_{CC}$ side) but not the emitter (constant-voltage output side) of a voltage-regulation transistor 507.

Figure 7:
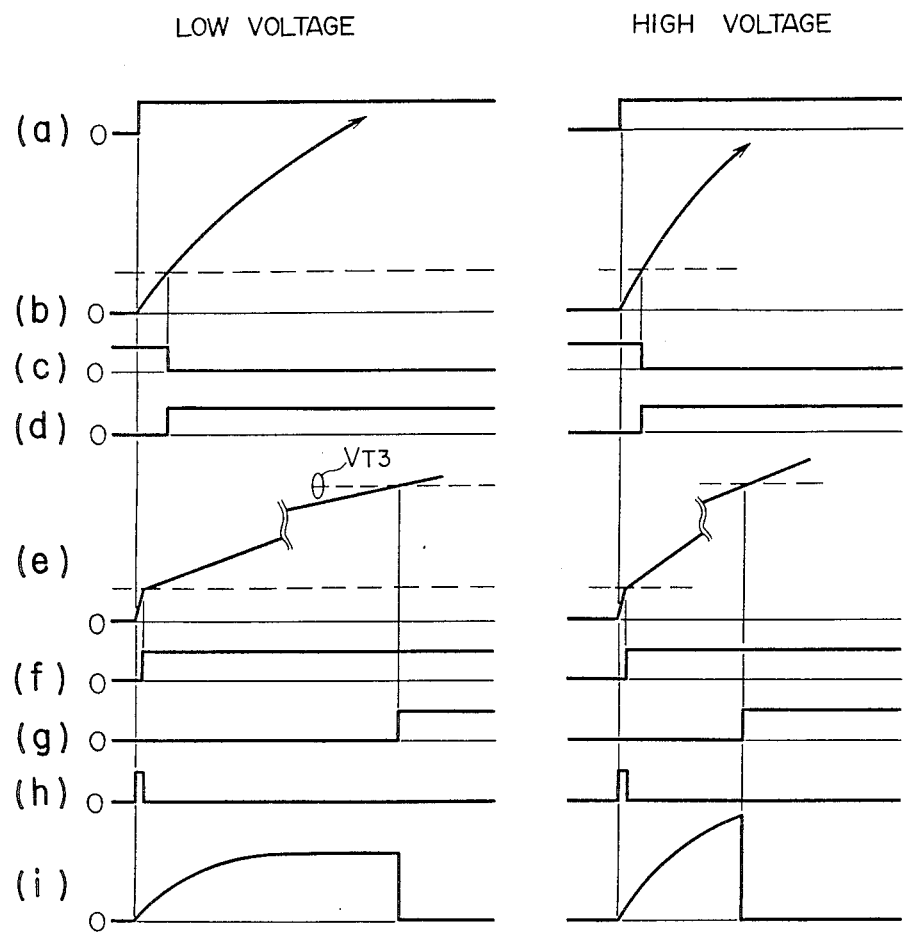
FIG. 7 shows waveforms produced at various parts of the system shown in FIG. 6 to explain its operation.

Waveforms produced at various parts of the second embodiment and corresponding to the right part of FIG. 2 are shown divided into a left part (battery voltage low) and a right part (battery voltage high) in FIG. 7. As will be seen from FIG. 7, in the case where the battery voltage is low, less current is charged on the capacitor 413 through the resistors 402, 403, and therefore a longer timer is required to forcibly turn off the power transistor 30. As a result, even in the case where the battery voltage is low and the internal combustion engine runs at a very low speed as at the time of engine start, for instance, the charge voltage of the capacitor 413 does not reach the third reference voltage $VT_3$, thus making accurate start of the internal combustion engine possible. When the battery voltage is high, by contrast, the current for charging the capacitor 413 increases, with the time shortened before the third reference voltage $VT_3$ is reached by the charge voltage of the capacitor 413, thereby making it possible to prevent the power transistor 30 and the ignition coil 40 from being unnecessarily heated during the stationary state of the engine.

In the aforementioned embodiment, an energization start signal is generated in the comparator circuit 313 at a time point when the integration value of the first integrating circuit reaches the predetermined value, and the ignition coil 40 starts to be energized at the time of generation of the energization start signal or when the angle signal of the signal generator 10 shifts from the first to the second section, whichever arrives earlier. The present invention, however, is not limited to such an operation but may of course be embodied with equal effect in such an alternative manner that the energization start signal for starting the energization of the ignition coil 40 may be generated at a time point of extinction of the reset pulse generated during a short period before the value of integration of the second integrating circuit started with generation of an output signal of the comparator circuit 313 reaches the small first preset small value. In short, it will be easily understood that the same effect is obtainable by a configuration in which the starting point of energization of the ignition coil is determined directly or indirectly when the integration value of the first integrating circuit reaches a predetermined value.

Figure 8:
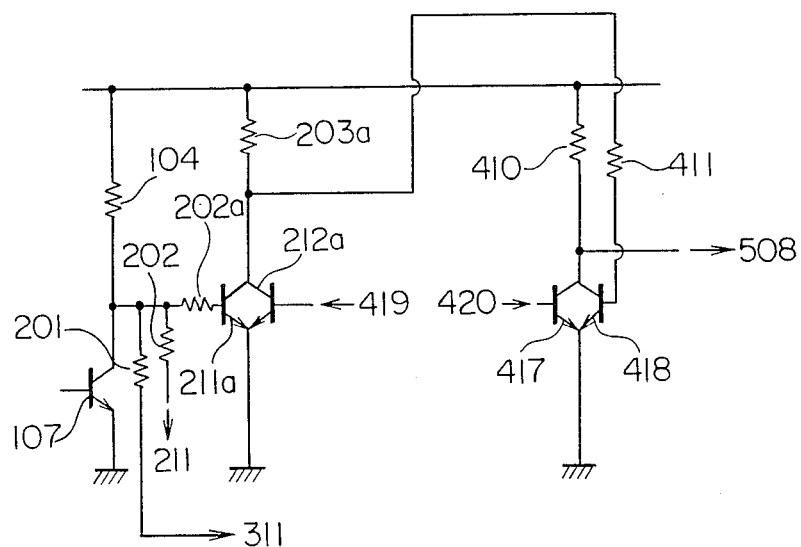
FIG. 8 is a circuit diagram showing essential parts of a third embodiment of the system according to the present invention.

FIG. 8 shows the essential parts of a third embodiment of the present invention in which an energization start signal is generated at a time point of extinction of a reset pulse. Unlike in the first embodiment described above, a logic circuit including resistors 202a, 203a, and transistors 211a, 212a is operated to logically process an angle signal of the signal generator 10 shown in FIG. 2(a) and an output signal of the comparator circuit 419 shown in FIG. 2(f), and the resultant logic output, instead of the logic output from the transistors 211, 212 shown in FIG. 2(d), is applied to the base of the transistor 418 through the resistor 411.

Also, unlike in the above-described embodiment with an integrating circuit including an analog circuit with a capacitor, another integrating circuit may instead be made up of a digital circuit including a counter, or the integration of the integrating circuit may be effected in opposite directions respectively to those shown in FIG. 2.

Further, in place of the signal generator 10 for controlling the ignition timing by a mechanical phase-advancing mechanism, another type signal generator for controlling the ignition timing electronically by use of a microcomputer may be employed.

According to the aforementioned embodiment of the present invention, during a sharp acceleration of the internal combustion engine, if the angle signal of the signal generator shifts from the first to the second section before generation of an energization start signal in the generator circuit, the power transistor is turned on, thereby starting conduction of the primary current in the ignition primary coil. In this way, even in sharp acceleration, a minimum of necessary primary current conduction time can be secured during the second section of the angle signal of the signal generator. Also, in synchronism with the conduction start of the primary current, the reset pulse of a short duration is generated by the reset circuit thereby to reset the integration value of an integrating circuit to an initial value instantaneously. It is thus possible to integrate the integrating circuit from the initial value in the next ignition cycle even in the case of sharp acceleration, thereby preventing the delay of the energization start timing which otherwise might occur in the next ignition cycle. As a result, a shortage of ignition energy is positively prevented.

Another advantage is that the second integrating circuit for controlling the generation of the reset pulse is used so as to cut off the power transistor, which is left on in the lock mode, thus providing a simplified arrangement for preventing the power transistor and the ignition coil from being unnecessarily heated.

Furthermore, the time required before the integration value of the second integrating circuit reaches the preset value is made to change according to the power source voltage in such a manner the higher the source voltage, the power transistor is turned off earlier. Thus it is made possible to prevent unnecessarily heating of the ignition coil or the power transistor when the battery voltage is high and the engine is stationarily locked. When the engine is in a very low speed region with the battery voltage low as in engine start, by contrast, the timing of turning off the power transistor is retarded thereby to assure accurate start of the engine.

Figure 9:
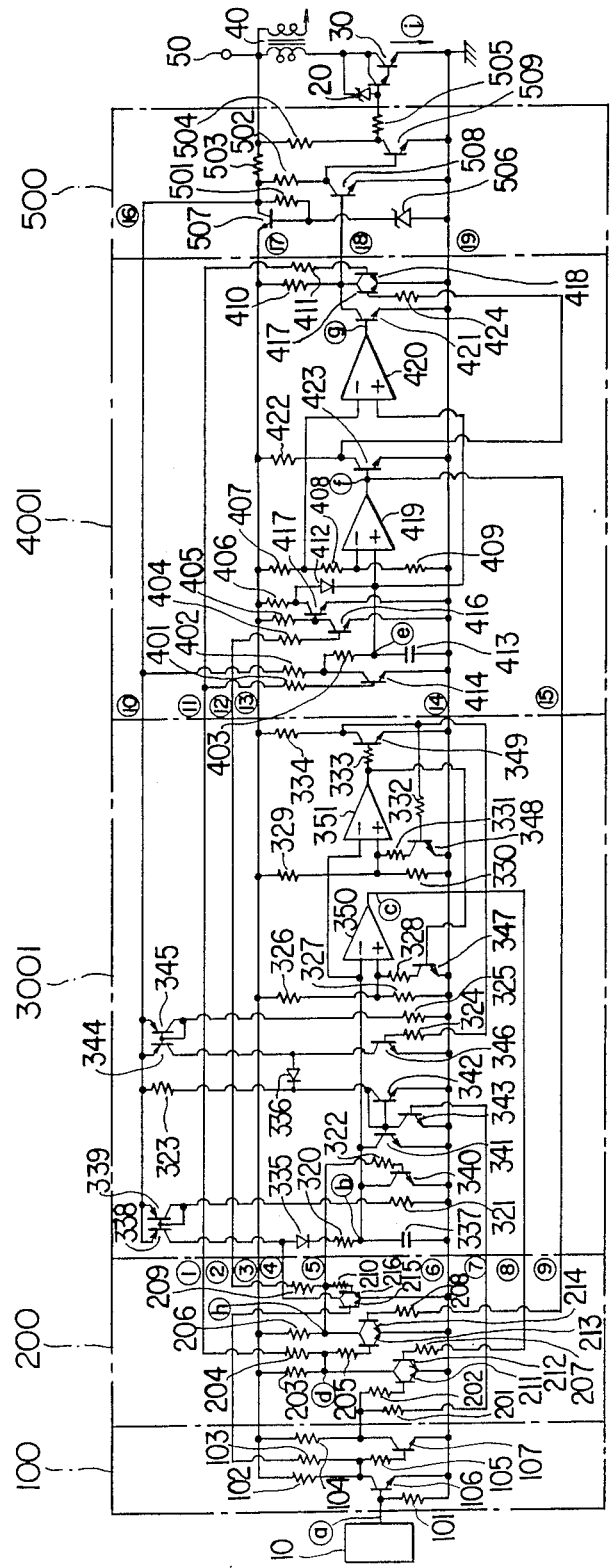
FIG. 9 is a circuit diagram showing a fourth embodiment of the system according to the present invention.

A fourth embodiment of the present invention is shown in FIG. 9, in which the summing-subtracting integrator circuit 300 and the continuous conduction blocking circuit 400 in FIG. 1 are replaced by modified circuits 3001 and 4001 respectively. The configuration and connections of the signal generator 10, input waveform shaping circuit 100, charge-discharge control circuit 200, constant-voltage output amplifier 500, and the ignition circuit 600 are identical to those of the embodiment shown in FIG. 1. In both the embodiments, the same reference numerals designate like component parts operating the same way.

Numeral 3001 designates the modified summing-subtracting integrator including resistors 320 to 334, diodes 335, 336, capacitor 337, transistors 338 to 349, and comparator circuits 350, 351. This modified integrator includes additional elements such as current mirror circuits comprising transistors 338, 339, 344, 345, diode 336 and comparator circuit 351, in comparison with the circuit 300 shown in FIG. 1.

Numeral 4001 designates the modified continuous-conduction blocking monostable circuit, which is different from the circuit 400 in FIG. 1 mainly in that the collector of a transistor 414 is connected through a resistor 402 to the collector power $V_{cc}$ line of the transistor 507 (the line between the terminals ⑩ and ⑯ ), the output ⓕ of the comparator circuit 419 is applied to the base of the transistor 417 through the collector of the transistor 423, and the output ⓖ of the comparator circuit 420 is connected to the base of the transistor 421, the collector of which is connected to a common collector of the transistors 417 and 418.

Figure 10:
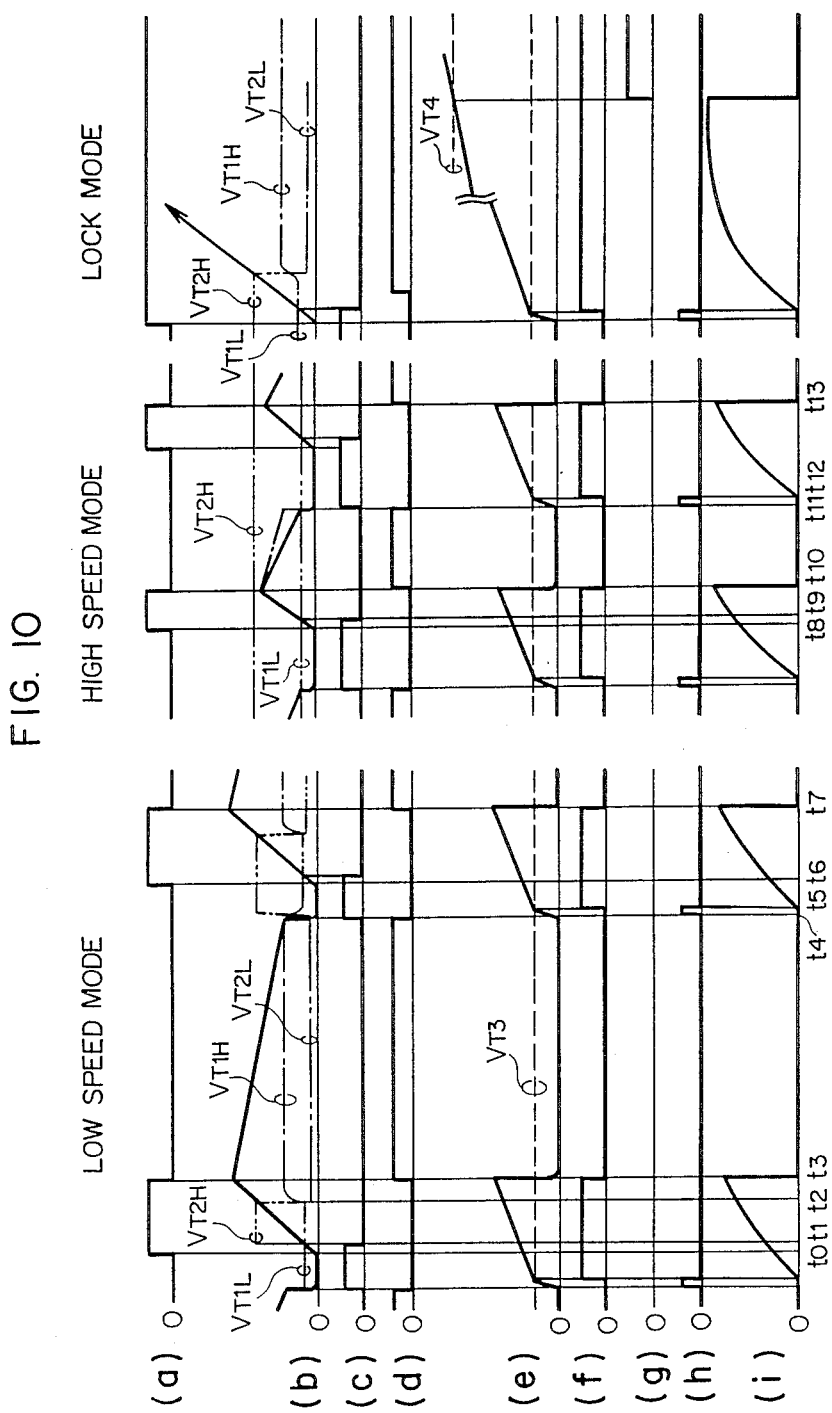
FIG. 10 shows waveforms produced at various parts of the system shown in FIG. 9 to explain its operation.

The operation of the circuit having a configuration explained above will be explained. In FIG. 10, the left part represents a comparatively low engine speed, the middle part a comparatively high engine speed, and the right part the engine stopped with the key switch turned on. The waveforms shown in (a) to (i) in FIG. 10 correspond to those designated by like characters in FIG. 9. First, the left part of FIG. 10 will be explained.

A certain voltage is charged across the capacitor 337 during the second section of the ignition cycle in the period from time point $t_0$ to $t_3$ where the angle signal of the signal generator 10 remains at high level. At the time point $t_1$ when the charge voltage reaches a low level $V_{T1L}$ of the first reference voltage determined by the resistors 326, 327 and 328 in parallel, the comparator circuit 350 changes from high to low level as shown in FIG. 10(c). Further, when the charge voltage of the capacitor 337 increases and reaches a high level $V_{T2H}$ of the second reference voltage determined by resistors 329 and 330 at a time point $t_2$, the comparator circuit 351 produces a low-level output, and the transistor 349 turns off, thus turning on the transistor 348. As a consequence, the resistor 330 is connected in parallel to the resistor 331, and the second reference voltage of the comparator circuit 351 itself is changed from high to low level of $V_{T2L}$. At the same time, the transistor 346 is turned on through the resistor 324 to block a current determined by transistors 344, 345 and a resistor 325 making up a current mirror circuit that has thus flowed through the diode 336 to the transistor 342. Therefore, the discharge current of the capacitor 337 in the first section is decreased to switch the discharging gradient. At the same time, the low-level output of the comparator circuit 351 turns off the transistor 348, with the result that the first reference voltage of the comparator circuit 350 is switched from low level to high voltage $V_{T1H}$. At the time point $t_3$ when the angle signal of the signal generator 10 changes from high to low level, the transistor 106 turns off and the transistor 215 on, so as to stop charging current of the capacitor 337 through the diode 335 and the resistor 320 that has thus far flowed and is determined by the resistor 321 and the current mirror circuit including the transistors 338 and 339. At the same time, the turning on of the transistor 107 of the input waveform shaping circuit 100 turns off the transistor 343, and starts the discharge (subtracting integration) of the charge voltage of the capacitor 337 through the transistor 341 by a current equal to the current flowing from the power supply (referred to as $V_{CC}$ described later) of the transistors through the resistor 325. As a result, the terminal voltage (with the waveform of FIG. 10(b)) of the capacitor 337 linearly decreases during the time when the angle signal of the signal generator 10 remains low in the first section of the ignition cycle.

At the time point $t_4$ when the voltage of the capacitor 337 decreases to the high level $V_{T1H}$ of the first reference voltage determined by the resistors 326 and 327, the output of the comparator circuit 350 (with a waveform shown in FIG. 10(c)) becomes high in level, so that the transistor 212 turns on and the transistor 213 off. At this time point, the output (FIG. 10(f)) of the comparator circuit 419 still remains low with the transistor 214 off, and therefore the output waveform of the common collector thereof (shown in FIG. 10(f)) rises to high level, so that the transistor 340 turns on and the capacitor 337 discharges rapidly to the initial value (0V). Also, the turning-on of the transistor 212 turns off the transistor 414, and the capacitor 413 begins to be charged up through the resistors 402 and 403 from $V_{CC}$. At the same time, the turning-off of the transistor 213 causes the transistor 416 to turn on and the transistor 417 off, so that the capacitor 413 is charged up through the diode 412 The terminal voltage (FIG. 10(e)) of the capacitor 413 rapidly increases. The turning-on of the transistor 212, on the other hand, turns off the transistor 418.

At the time point when the terminal voltage of the capacitor 337 is reduced to the low level $V_{T2L}$ of the second reference voltage of the comparator circuit 351 by the discharge of the capacitor 337 as a result of the turning on of the transistor 340, the comparator circuit 351 produces a high level output, so that the transistor 349 is turned on and the transistor 348 off, thereby changing the second set trigger voltage to high voltage level $V_{T2H}$ while at the same time turning off the transistor 347. At the same time, the transistor 348 is also turned on, and the resistor 328 is connected in parallel to the resistor 327 thereby to switch the first set trigger voltage to a low level voltage $V_{T1L}$ determined by the ratio thereof with the resistor 326.

At the time point $t_5$ when the terminal voltage across the capacitor 413 reaches a third reference voltage $VT_3$ determined by the resistance ratio between the resistors 407, 408 and the resistor 409, the output (FIG. 10(f)) of the comparator circuit 419 becomes high in level, and the transistor 214 turns on thereby to extinguish the reset pulse shown in FIG. 10(h). As a result of the turning on of the transistor 423, the transistor 417 turns off. Since both the transistors 421 and 418 are off, the transistor 508 is turned on, while the transistor 509 turns off, so that a base current flows from the drive resistor 504 through the resistor 505 to the power transistor 30 thereby to start turning on the same power transistor 30. With the turning on of the transistor 214, the transistor 416 turns off, and the transistor 417 on. Therefore, the rapid charging of the capacitor 413 is stopped, with the result that the charge waveform of the capacitor 413 (FIG. 10(e)) takes a gentle curve. In the process, since the transistor 215 is on although the transistor 216 is off, the capacitor does not start being charged.

At the time point $t_6$ when the angle signal (FIG. 10(a)) of the signal generator 10 becomes high in level, the transistor 106 is turned on and the transistor 215 off, thereby starting the charging of the capacitor 337 through the resistor 301.

At the time point $t_7$ when the output of the signal generator 10 declines to low level again, the transistor 211 is turned off and the transistor 418 on. The power transistor 30 turns off, cutting off the energization of the primary coil of the ignition coil 40 while inducing an ignition high voltage in the secondary at the same time.

Now, the middle part of FIG. 10 will be explained. With the increase in engine speed, even when the charging of the capacitor 337 is started at time point $t_8$, the charge voltage of the capacitor 337 does not reach the high level $V_{T2H}$ of the second reference voltage of the comparator circuit 351, and therefore the comparator circuit 350 remains at high level output. As a result, the transistor 347 turns on and the first reference voltage remains at the low level $V_{T1L}$. The transistor 331 is on and the transistor 347 off, so that a current equivalent to the current flowing in the resistor 325 and the current flowing in the resistor 323 are combined to make up a current flowing to the transistor 342 constituting a current mirror circuit. The charges of the capacitor 337 are thus released with slightly more current than at the low engine speed.

The right part of FIG. 10 will be briefly explained. Assume that at the time of turning on the key switch, the engine stops and the angle signal of the signal generator 10 is left at high level and the transistor 211 left on, or the angle signal of the signal generator 10 is reduced to low level with the capacitor 337 discharged to zero, leaving the transistor 212 on and the transistor 418 off.

The terminal voltage across the capacitor 413 continues to rise and at the time point when the voltage of the capacitor 413 reaches a fourth reference voltage $VT_4$ dependent on the ratio of the resistors 408, 409 to the resistor 407 set at a value sufficiently large as compared with the third reference voltage $VT_3$, the output (FIG. 2(g)) of the comparator circuit 420 becomes high in level, and the transistor 421 turns on, thus interrupting the continuous conduction of the power transistor 30.

Figure 11:
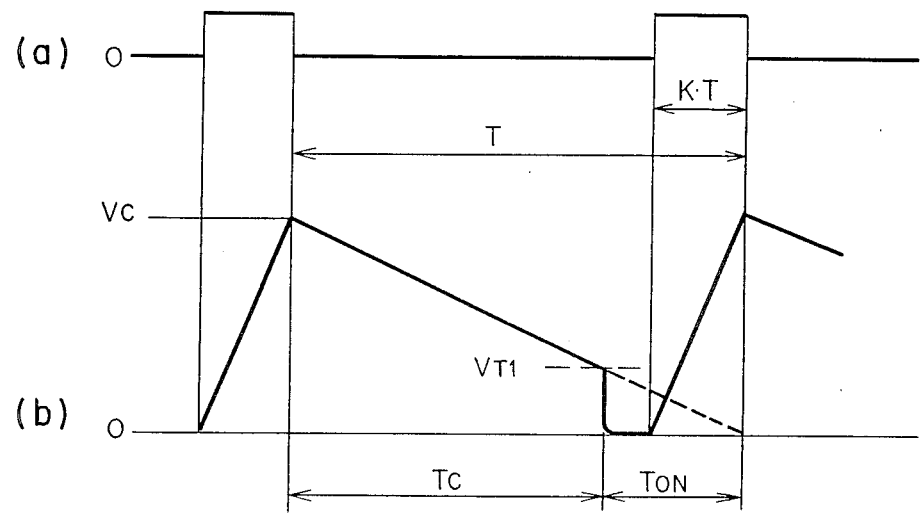
FIGS. 11 to 13 show waveforms for further explaining the operating principle of the system according to the present invention.

Now, the characteristic of the energization angle $\theta$ versus the change in engine speed N will be quantitatively explained. First, explanation will be made of the principle of dwell-angle control with reference to FIG. 11. In FIG. 11, (a) represents an angle signal waveform of the signal generator 10, and (b) a terminal voltage waveform of the capacitor 337 of the summing-subtracting integrator 3001. Assume that the ratio between the high and low level periods of the output of the signal generator 10 is set with the high level period represented by K as shown with an ignition cycle T for a given engine speed. During this high level period, that is, during K·T, the capacitor 337 is subjected to the summing integration (to be charged), and during the remaining period (T−K·T), to the simply subtracting integration of time (to be discharged). At a time point when the value of the subtracting integration reaches a predetermined value $VT_1$, the ignition coil 40 begins to be energized. The energization is stopped at a fall point from high to low level of the angle signal of the signal generator 10. If the section defined by $T_{ON}$ in FIG. 11 represents the time of energization of the ignition coil 40, the energization angle is as follows.

If the rate of the subtracting integration is taken equal to K against the rate of the summing integration, the amount of the summing integration under steady condition $V_C$ is reduced to just zero by the subtracting integration during the T section of the next ignition cycle, and the energization time span $T_{ON}$ started at a predetermined value $VT_1$ is secured as of a constant span regardless of magnitude changes of $V_C$ with changes in engine speed. In short, the energization time span characteristic depends on the ratio of the rate of the subtracting integration to that of the summing integration.

Figure 12:
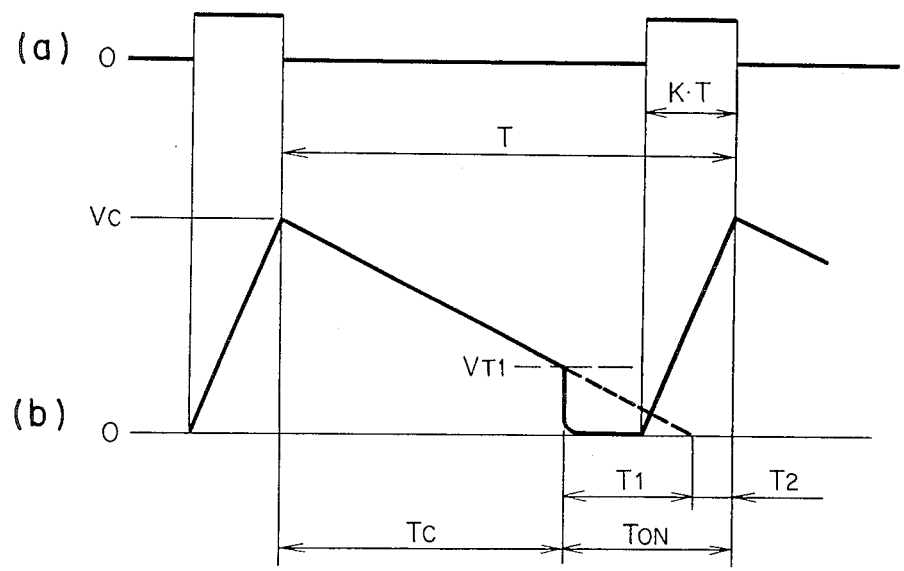

Assume, for example, that the rate of the subtracting integration is set to a slightly larger value as shown in FIG. 12. The time span is divided into a portion $T_1$ with a fixed time and remaining unchanged with changes of engine speed and a portion $T_2$ with fixed angle and changing in reverse proportion to changes of engine speed. The portion $T_2$ increases with the decrease in engine speed, and therefore it is possible to set a sufficient or more energization time against the ideal dwell angle characteristic in the low-speed region where the energization time often runs short at the time of acceleration of the internal combustion engine.

Figure 13:
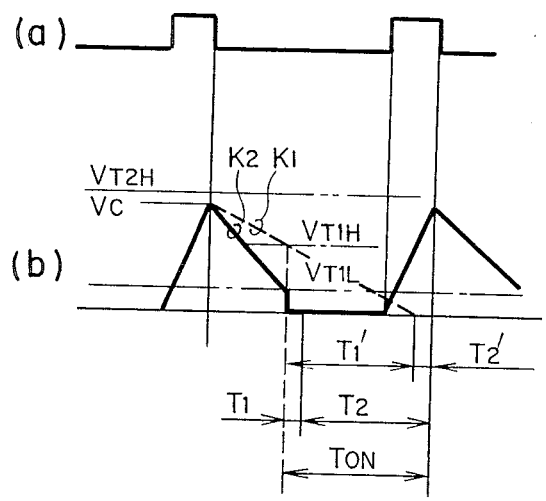
Figure 14:
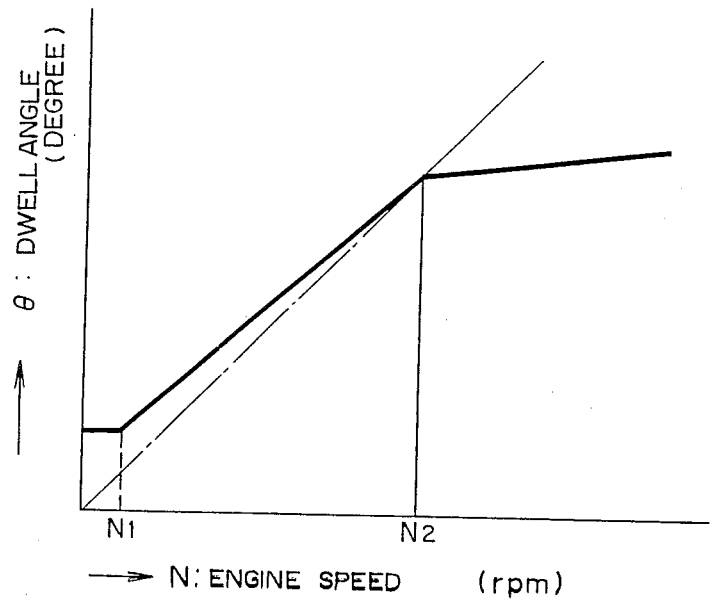
FIG. 14 is a diagram showing the characteristic of engine speed versus dwell angle of the system shown in FIG. 9.

Now, the characteristic of the energization angle $\theta$ with a higher engine speed N will be explained quantitatively with reference to FIG. 13. If the charging voltage $V_C$ of the capacitor 337 ceases to reach the high level $V_{T2H}$ of the second preset trigger voltage during the high level period of the signal generator 10, the first preset trigger voltage $V_{T1}$ assumes a low level $V_{TIL}$. As a result, the ratio between the portion $T_1'$ with fixed time and portion $T_2'$ with fixed angle with the energization time $T_{ON}$ thus far obtained by using the subtracting integration rate $K_1$ in the first section and by triggering at the high level voltage $V_{T1H}$ of the first preset trigger voltage, changes to the ratio between the portion $T_1$ with fixed time and the portion $T_2$ with fixed angle although the same energization time $T_{ON}$ is obtained by using the subtracting integration rate $K_2$ in the first section and by triggering at the low level voltage $V_{T1L}$ of the first preset trigger voltage. The energization time $T_{ON}$ is thus switched in such a manner that the fixed angle portion rather than the fixed time portion becomes a great influential factor. As a result, the dwell angle control characteristic, as shown by engine speed N in FIG. 14, changes at an angle dependent on the high-level ratio K of the signal generator 10 in a low-speed region below $N_2$, while the control characteristic switches so that the fixed angle becomes an influential factor in a high engine speed region above $N_2$. A substantially constant size of dwell angle is thus secured for duration of spark arcs when engine speed is high.

In the case of sharp acceleration of the internal combustion engine, the output of the signal generator 10 changes from low to high level before the discharge voltage of the capacitor reaches the first reference voltage, the transistor 211 is turned on, so that the power transistor 30 is turned on through the transistors 421, 508 and 509, thereby starting conduction of the primary current in the ignition coil 40. Even in sharp acceleration, it is thus possible to secure a minimum of necessary energization time of the primary current during the high level output of the signal generator 10.

Also, a reset pulse with a short duration as shown in FIG. 2(h) is generated in the base of the transistor 321 before generation of the primary current, with the result that the transistor 321 is instantaneously turned on to discharge the charge voltage of the capacitor 321 to the initial value (0V) instantaneously. The duration of the reset pulse is so short that it does not substantially affect the charge of the capacitor 337 during the second section.

The amount of charge in the capacitor 312 in the second section of the ignition cycle is detected by the comparator circuit 321 to stop the subtracting integration of the capacitor 312. Therefore, even when the decrease of engine speed to a very low level causes the summing integration in the second section to be restricted by the source voltage $V_{CC}$, an excessively early energization in the first section is prevented, thus preventing an excessive energization time in a very low speed region.

Figure 15:
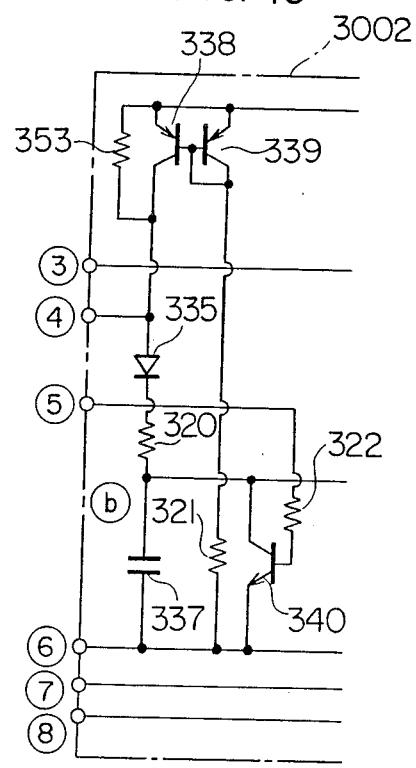
FIG. 15 is a circuit diagram showing another embodiment of a summing-subtracting integrator used in the system shown in FIG. 9.

FIG. 15 shows a part of another modification 3002 of the summing-subtracting integrator circuit 3001 applied to the system shown in FIG. 1. Unlike in the summing-subtracting integrator circuit 3001 of the system shown in FIG. 9, a resistor 353 is added, the remaining parts being the same as in the system of FIG. 9. The summing integration of the capacitor 337 is effected by combination of the linear summing integration and the exponential summing integration, resulting in a somewhat different configuration but with an equivalent effect.

In the embodiment described above, the integration value of the second integrating circuit started with the generation of an output signal of the comparator circuit section 350 is such that an energization start signal for starting the energization of the ignition coil 40 is generated at the time of extinction of the reset value of a small value. Instead, it is of course possible to obtain the same effect if an energization start signal is generated in the comparator circuit section 350 when the integration value of the first integrating circuit has reached the predetermined value, so that the energization is started upon generation of this energization start signal or at the time of shift of the angle signal of the signal generator 10 from the first to the second section, whichever arrives first. In short, it will be easily understood that an equivalent effect is obtained by a configuration for determining the start of the energization of the ignition coil directly or indirectly at the time point when the integration value of the first integrating circuit has reached a predetermined value.

Also, in the above-described embodiment, instead of an integrating circuit comprising an analog circuit including a capacitor, an integrating circuit may be configured of a digital circuit including a counter or the direction of integration of the integrating circuit may be opposite to the direction specified in FIG. 10 with equal effect.

Further, the signal generator 10, in place of the one which controls the ignition timing by a mechanical advancing means, may be of such a construction that the ignition timing is controlled by microcomputer or the like.

It will thus be understood from the foregoing description of the embodiments shown in FIGS. 9 to 15 that when the angle signal of the signal generator shifts from the first to the second section before the energization start signal is generated in the energization start signal generator circuit during a sharp acceleration of the internal combustion engine, the power transistor is turned on thereby to start the energization of the primary of the ignition coil. As a result, even during a sharp acceleration, it is possible to secure at least the conduction time of the primary current during the second section of the angle signal of the signal generator.

Also, the engine speed is detected to switch the fixed energization time control to the fixed energization angle control during the high speed engine operation, thereby making it possible to secure an optimum energization angle for securing a spark arc timing even during high speed engine operation.

Figure 16:
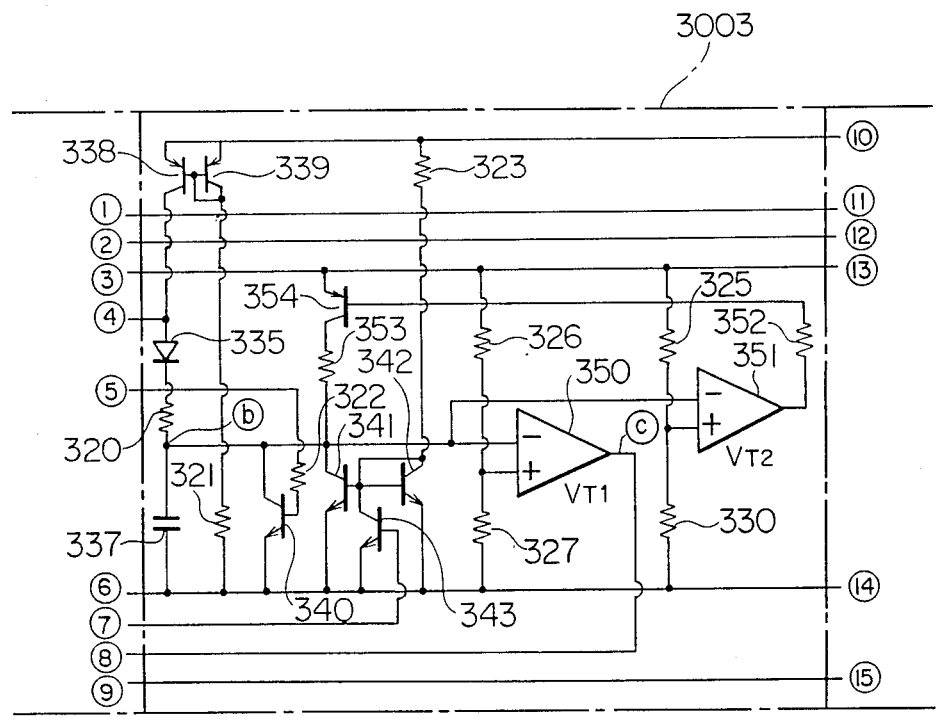
FIG. 16 shows an electrical circuit according to a fifth embodiment of the system according to the present invention.

A fifth embodiment of the present invention is shown in FIG. 16, comprising a modified circuit 3003 which is a further modified form of the modified summing-subtracting integrating circuit 3001 in FIG. 9. In this embodiment, the diode 326, current mirro transistors 345, 346 and the transistors 348, 349 are removed from the circuit 3001, and instead of them, a transistor 354 is connected thereto thereby to control the charge of the capacitor 337 from a power line (an emitter output line of the transistor 507 in FIG. 9) by an output of the comparator circuit 351. These two embodiments have the same component parts designated by like reference numerals and operating the same way. The other circuits 10, 100 to 600, etc., therefore, are not shown.

Figure 17:
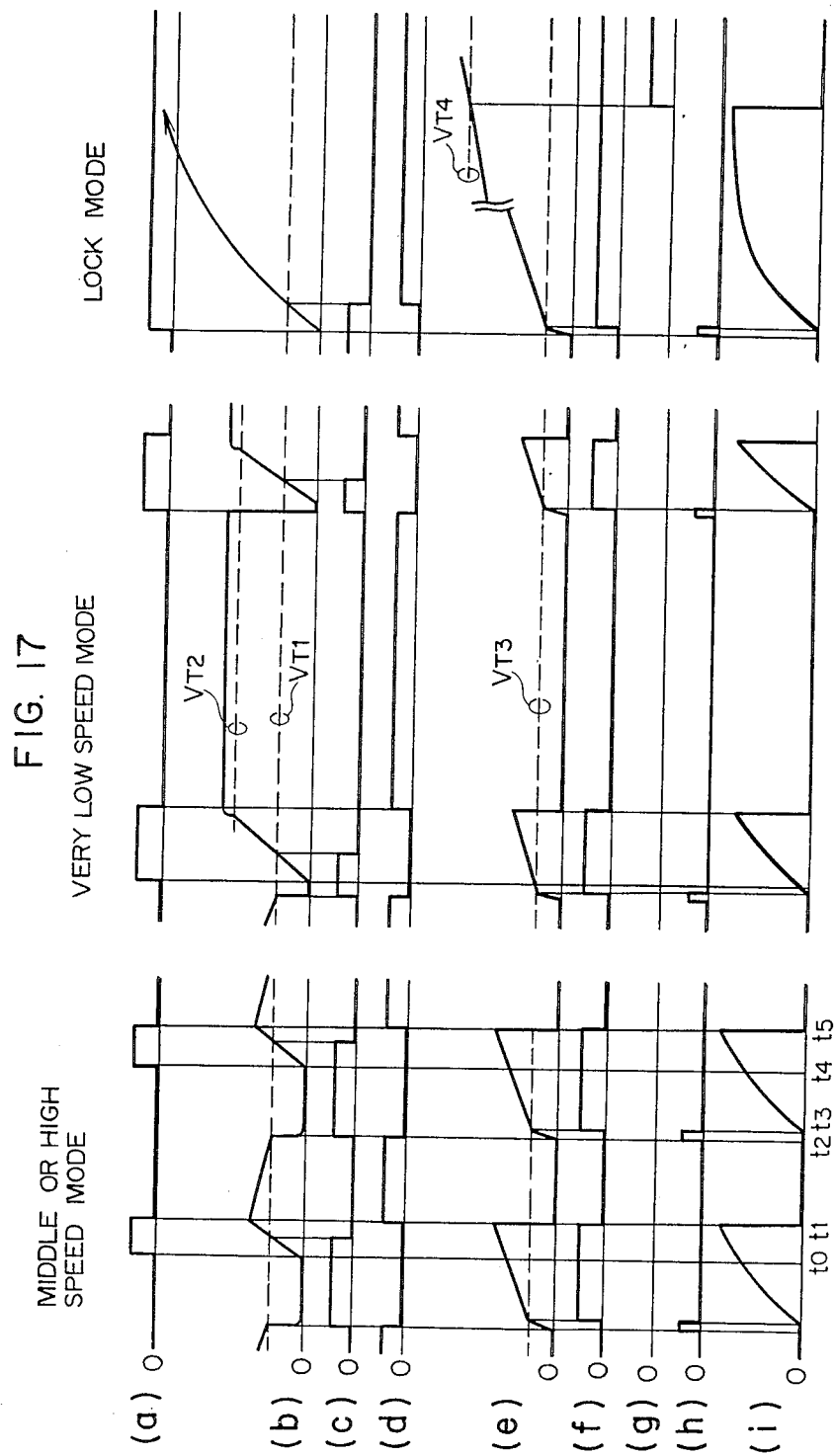
FIG. 17 shows waveforms produced at various parts of the system shown in FIG. 16 to explain its operation.

Explanation will be made of the operation of the system having a configuration shown in FIG. 16. In FIG. 17, the left part represents a sufficiently high engine speed, the middle part an engine speed very low as at the time of start, and the right part the engine stopped with the key switch turned on. In FIG. 17, waveforms shown by (a) to (i) correspond to the waveforms designates by the same characters in FIG. 16 or 17 respectively.

The operation associated with the left part (middle and high speed) and the right part (engine locked) in FIG. 17 is substantially identical to the operation associated with the fourth embodiment shown in FIGS. 9 and 10 with the exception of the charging operation of the capacitor 337. Therefore, these parts are neither described nor indicated but only the operation waveforms thereof are shown. The explanation below is thus limited to a very low engine speed as at the time of engine start. When the engine speed is low as at the time of engine start or immediately after it, the ignition cycle is lengthened, and therefore the second section of the ignition cycle also becomes long to increase the charging time of the capacitor 337. As a consequence, at the time point when the terminal voltage of the capacitor 337 reaches a second reference voltage $VT_2$ determined by the resistors 329 and 330, the output of the comparator circuit section 351 becomes low in level, with the result that the transistor 354 is turned on, causing the capacitor 337 to be charged rapidly via the resistor 353. Thus, even if the shift of the ignition cycle from the second to the first section, the fact that the charge current through the resistor 353 is larger than the discharge current through the transistor 341 prevents the time subtracting integration of the capacitor 337 from being effected. The terminal voltage of the capacitor 337 thus does not decrease below the first reference voltage $VT_1$ in the first section. At the time when the ignition cycle shifts from the first to the second section again, the transistor 340 is turned on so that the charges of the capacitor 337 are discharged rapidly to the initial value (0V) in the duration of the reset pulse (waveform (h) in FIG. 17). At the time point when the output of the comparator circuit 419 rises to high level to extinguish the reset pulse, the transistor 417 turns off while the power transistor 30 turns on thereby to start energization of the ignition coil 40.

As a result of discharge of the charges of the capacitor 337 to the initial value, on the other hand, the output of the comparator circuit 351 becomes high in level, with the result that the transistor 354 turns off and the capacitor 337 ceases to be discharged rapidly.

Figure 18:
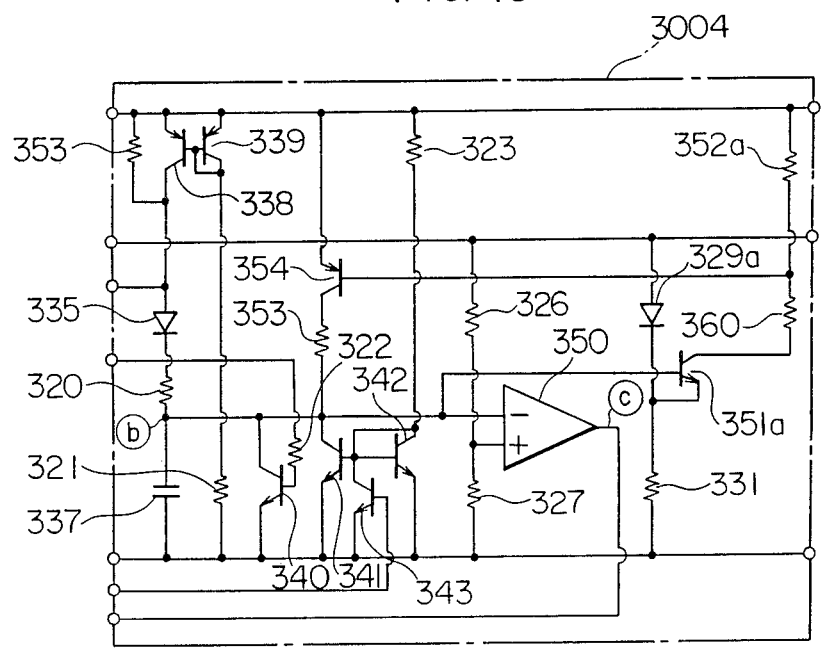
FIGS. 18 and 19 are electrical circuit diagrams respectively showing another embodiments of the summing-subtracting integrator used in the system shown in FIG. 16.

FIG. 18 shows a circuit 3004 making up another embodiment of the summing-subtracting integrating circuit 3003 applied to the system according to the fifth embodiment shown in FIG. 16. In this embodiment, a resistor 353 is added parallely to the transistor 338 of the summing-subtracting integrating circuit 3003 to perform the summing integration of the capacitor 337 by combination of the linear summing integration and the logarithmic summing integration. This embodiment, though somewhat different in configuration, has the same effect as the aforementioned embodiments.

Further, in the embodiment shown in FIG. 18, unlike the circuit of FIG. 16, a diode 329a is used in place of the resistor 329, and the emitter of the transistor 354 making up an integration amount increasing circuit is connected to the collector but not to the emitter of the constant-voltage transistor 507. Further, a resistor 352a is inserted between the emitter and base of the transistor 354, and the comparator circuit 351 including a multiplicity of transistors is replaced by a single transistor 351a with the emitter thereof connected to the junction of the diode 329a and the resistor 331, the base thereof connected to the capacitor 312 and the collector thereof to the resistor 360, thus simplifying the circuit configuration.

Figure 19:
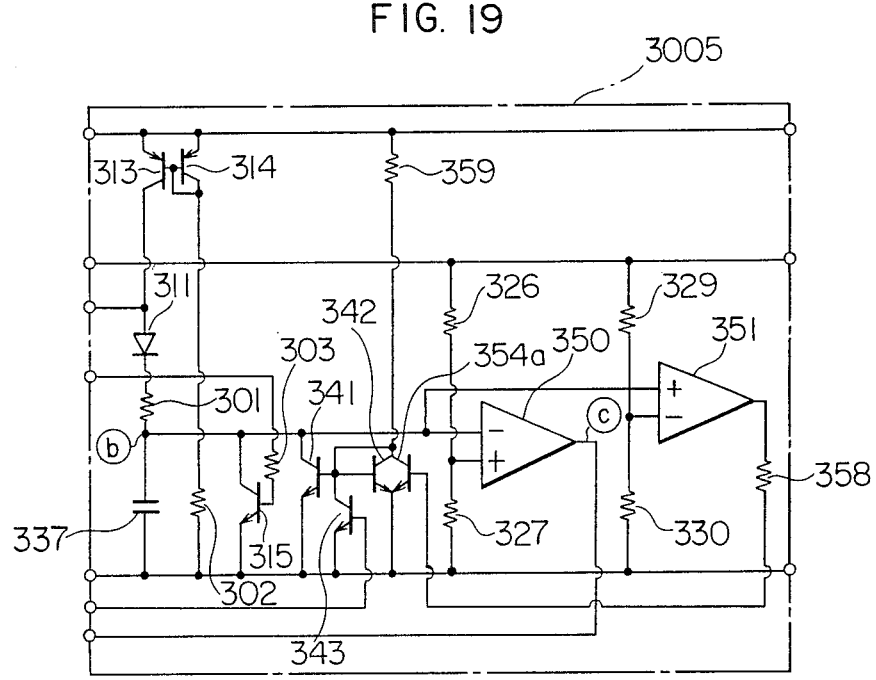

The fifth embodiment described above operates in such a manner that the charge voltage of the capacitor 337 is detected and the summing integration is effected at a rate larger than the subtracting integration to prevent an increase in dwell angle with the saturation of the amount of summing integration at the time of very low speed engine operation. The invention, however, is not limited to such a configuration, but as shown in the modified summing-subtracting integrating circuit 3005 of FIG. 19, instead of the charge circuit including the resistor 353 and the transistor 354 in FIG. 16, a transistor 354a making up an integration-preventing circuit driven by an output from the comparator circuit 351 may be connected in parallel to the transistor 342 on the discharge circuit side. Also, by reversing the input polarity of the comparator circuit 351, the subtracting integration may be stopped at the time point when the charge voltage of the capacitor 337 reaches a second reference voltage $VT_2$.

It will thus be understood from the foregoing description that according to the embodiment shown in FIGS. 16 to 19, with the shift of the angle signal of the signal generator from the first to the second section before generation of the energization start signal in the energization start signal generator circuit during sharp acceleration of the internal combustion engine, the power transistor is turned on thereby to start the conduction of the primary current of the ignition coil. As a result, at least the primary current conduction time is secured in the second section of the angle signal of the signal generator even during a sharp acceleration.

Also, in view of the fact that an integration value of the integrating circuit corresponding to the engine speed is detected to fix the dwell angle to the second section of the signal generator under a very low speed engine operation, an excessive dwell angle is prevented under a very low engine speed with a comparatively simple configuration. Further, the energization start signal is prevented from being generated simply by invalidating the integration in the other direction of the integrating circuit substantially.

We claim:

1. An ignition system for an internal combustion engine comprising:
   signal generator means for generating an angle signal defining substantially constant first and second sections of an ignition cycle;
   integrating means for integrating in one direction during one of said section of the ignition cycle and integrating in the other direction during the other section of said cycle;
   start-signal generator means for generating a coil-energization start signal in synchronism with a time point when the integration value of the integrating means reaches a predetermined valve during the first section;
   a power transistor connected to be turned on and off in response to the generation of the coil-energization start signal and the switching of the angle signal between its first and second sections;
   an ignition coil for generating a high voltage by turning on and off primary current thereof in response to the turning on and off of the power transistor;
   means for commanding the integrating means to integrate in one direction in the second section of a preceding ignition cycle and in the other direction in the first section of the next ignition cycle;
   control means for turning on the power transistor at the generation of the coil-energization start signal and the switching of the angle signal from the first section to the second section, whichever arrives earlier, the power transistor being turned off by said control means when the angle signal switches from the second section to the first section; and
   rest means for generating a reset pulse of a short duration for resetting the integration value of the integrating means to an initial value in synchronism with the start of the primary current in the ignition coil, and wherein said predetermined value used by said start-signal generator means is larger than said initial value.

2. An ignition system according to claim 1, wherein the integration value of the integrating means changes exponentially in the second section.

3. An ignition system according to claim 1, wherein the coil-energization start signal is generated immediately when the integration value of the integrating means reaches the predetermined value in the first section, and the rest pulse is generated simultaneously with the coil-energization start signal.

4. An ignition system according to claim 1, further comprising means for detecting the engine speed and changing the rate of integration in the other direction of the integrating circuit in the first section and also a set value of the energization start signal generator circuit.

5. An ignition system according to claim 1, further comprising an energization start signal invalidating circuit for substantially invalidating the energization start signal when the integration value in one direction of the integrating circuit reaches a second set value corresponding to a preselected low engine speed in the second section of the ignition cycle.

6. An ignition system according to claim 1, further comprising an integration control circuit for substantially invalidating the integration in the other direction of the integration value of the integrating circuit in the first section of an ignition cycle when the integration value in one direction of the integrating circuit in the second section reaches a second set value corresponding to a set low engine speed in the preceding ignition cycle.

7. An ignition system according to claim 6, wherein said integration control circuit includes an integration-rate increasing circuit for integrating the integrating circuit in one direction at a rate higher than in the other direction when the integration value in said one direction of the integrating circuit reaches the second set value.

8. An ignition system according to claim 6, wherein said integration control circuit includes an integration-preventing circuit for preventing the integration in the other direction in the first section when the integration value in one direction of the integrating circuit reaches the second set value.

9. An ignition system for an internal combustion engine comprising:
   signal generator means for generating an angle signal defining substantially constant first and second sections of an ignition cycle;
   integrating means for integrating during one direction in one section of the ignition cycle and in the other direction during the other section thereof;
   start-signal generator means for generating a coil-energization start signal in synchronism with a time pint when the integration value of the integrating means reaches a predetermined value in the first section;
   a power transistor connected to be turned on and off in response to the generation of the coil-energization start signal and switching of the angle signal between its first and second sections;
   an ignition coil for generating a high voltage by turning on and off primary current thereof in response to the turning on and off of the power transistor,
   means for commanding the integrating means to integrate in one direction during the second section of a preceding ignition cycle and in the other direction during the first section of the next ignition cycle;
   control means for turning on the power transistor at the generation of th coil-energization start signal and the switching of the angle signal from the first section to the second section, whichever arrives earlier, the power transistor being turned off by said control means when the angle signal switches from the second section to the first section; and
   rest means for generating a reset pulse of a short duration for resetting the integration value of the integrating means in synchronism with the start of the primary current in the ignition coil, wherein the reset when the integration value of the integrating means reaches a predetermined value in the first section, and the energization start signal is generated from the energization start signal generator means at the time of extinction of the reset pulse of the reset means.

10. An ignition for an internal combustion engine comprising:
    signal generator means for generating an angle signal defining substantially constant first and second sections of an ignition cycle;

integrating means for integrating during one direction in one section of the ignition cycle and in the other direction during the other section thereof;

start-signal generator means for generating a coil-energization start signal in synchronism with a time point when the integration value of the integration means reaches a predetermined value in the first section;

a power transistor connected to be turned on and off in response to the generation of the coil-energization start signal and switching of the angle signal between its first and second sections;

an ignition coil for generating a high voltage by turning on and off primary current thereof in response to the turning on and off of the power transistor, means for commanding the integrating means to integrate in one direction in the second section of a preceding ignition cycle and in the other direction in the first section of the next ignition cycle;

control means for turning on the power transistor at the generation of th coil-energization start signal and the switching of the angle signal from the first section to the second section, whichever arrives earlier, the power transistor being turned off by said control means when the angle signal switches from the second section to the first section;

second integrating means for starting integration in synchronism with a star of conduction of the primary current in the ignition coil and being reset in the first section of the angle signal of the signal generator means;

first integration-value detection means for detecting that the integration value of the second integrating means that has started integration reaches a first preset small value and generating a rest pulse of a short duration for resetting the integration value of the first integrating means to an initial value; and second integration value detection means for turning off the power transistor upon detection that the integration value of the second integrating means reaches a second preset value sufficiently large than the first set value.

11. An ignition system according to claim 10, wherein the rate of increasing the integration value of the second integrating means decreases polygonally as compared with the rate before reaching the first preset value.

12. An ignition system according to claim 10, wherein the rate of increasing the integration value of the second integrating means increases with the increase in a source voltage.

13. An ignition system for an internal combustion engine comprising:

signal generator means for generating an angle signal defining substantially constant first and second sections of an ignition cycle;

integrating means for integrating in one direction during a first section of the ignition cycle and in the other direction during other section thereof;

start-signal generator means for generating a coil-energization start signal in synchronism with a time point when the integration value of the integrating means reaches a predetermined value in the first section;

a power transistor connected to be turned on and off in response to the generation of the coil-energization start signal and switching of the angle signal between its first and second sections;

an ignition coil for generating a high voltage by turning on and off primary current thereof in response to the turning on and off of the power transistor, means for commanding the integrating means to integrate in one direction in the second section of a preceding ignition cycle and in the other direction in the first section of the next ignition cycle;

control means for turning on the power transistor at the generation of the coil-energization start signal and the switching of the angle signal from the first section to the second section, whichever arrives earlier, the power transistor being turned off by said control means when the angle signal switches from the second section to the first section;

rest means for generation a reset pulse of a short duration for resetting the integration value of the integrating means in synchronism with the start of the primary current in the ignition coil;

a second integrating means for starting integration at a voltage upon conduction of the primary current of the ignition coil and reset during the first section of the angle signal of the signal generator means; and integration value detection means for turning off the power transistor upon detection that the integration value of the second integrating means reaches a set value.

14. An ignition system for an internal combustion engine comprising:

signal generator means for generating an angle signal defining substantially constant first and second sections of an ignition cycle;

integrating means for integrating in one direction during one of said first and second sections of the ignition cycle and integrating in the other direction during the other section thereof;

start-signal generator means for generating a coil-energization start signal in synchronism with a time point when the integration value of the integrating means reaches a predetermined value in the first section;

a power transistor connected to be turned on and off in response to the generation of the coil-energization start signal and switching of the angle signal between its first and second sections;

an ignition coil for generating a high voltage by turning on and off primary current thereof in response to the turning on and off of the power transistor;

means for commanding the integrating means to integrate in one direction during the entirety of the second section of a preceding ignition cycle and in the other direction during the first section of the next ignition cycle;

control means for turning on the power transistor at the generation of the coil-energization start signal and the switching of the angle signal from the first section to the second section, whichever arrives earlier, the power transistor being turned off by said control means when the angle signal switches from the second section to the first section; and means for detecting an engine speed and changing the rate of integration in the other direction of the integration means in the first section and also changing a set value of the energization start signal generator means, thereby switching a dwell-angle characteristic of the system in a high-speed range of the engine.

* * * * *